(12) United States Patent
Sponholtz

(10) Patent No.: US 11,785,020 B2
(45) Date of Patent: Oct. 10, 2023

(54) METHOD OF ESTABLISHING AD-HOC DEVICE-BASED TRUST

(71) Applicant: AEROGUEST APS, Aarhus C (DK)

(72) Inventor: Martin Sponholtz, Aarhus C (DK)

(73) Assignee: Aeroguest APS, Aarhus (DK)

( * ) Notice: Subject to any disclaimer, the term of this patent is extended or adjusted under 35 U.S.C. 154(b) by 0 days.

(21) Appl. No.: 17/739,839

(22) Filed: May 9, 2022

(65) Prior Publication Data

US 2022/0263838 A1   Aug. 18, 2022

Related U.S. Application Data

(63) Continuation of application No. PCT/DK2020/050303, filed on Nov. 6, 2020.

(30) Foreign Application Priority Data

Nov. 8, 2019 (DK) .................................. 201970686

(51) Int. Cl.
*H04L 9/40* (2022.01)
*G06Q 10/02* (2012.01)

(52) U.S. Cl.
CPC .......... *H04L 63/126* (2013.01); *G06Q 10/02* (2013.01); *H04L 63/04* (2013.01); *H04L 63/062* (2013.01); *H04L 63/101* (2013.01); *H04L 63/18* (2013.01)

(58) Field of Classification Search
CPC ... H04L 63/126; H04L 63/062; H04L 63/101; H04L 63/18; G06Q 10/02
See application file for complete search history.

(56) References Cited

U.S. PATENT DOCUMENTS

| | | | | |
|---|---|---|---|---|
| 7,433,836 | B1 * | 10/2008 | August | G06Q 20/14 |
| | | | | 705/30 |
| 2003/0208386 | A1 * | 11/2003 | Brondrup | G06Q 10/02 |
| | | | | 705/5 |
| 2009/0235069 | A1 * | 9/2009 | Sonnega | H04L 63/062 |
| | | | | 713/176 |

(Continued)

FOREIGN PATENT DOCUMENTS

WO   2019169958   9/2019

*Primary Examiner* — Phy Anh T Vu
(74) *Attorney, Agent, or Firm* — Ruggiero McAllister & McMahon LLC

(57) ABSTRACT

A method for establishing ad-hoc trust between a guide device and an invitee device to exchange sensitive guest data. The method includes: receiving, at a verification system, a request from the guide device for data pertaining to a specific guest profile at the verification system through an authorised first communication channel; transmitting, by the verification system, a guest booking confirmation to the guide device; receiving, by the verification system, a connection request from the invitee device through an internet browser accessible public access portal resulting in an unverified second communication channel; generating two unique and matching keys in response to the connection request; forming, by the verification system using the two unique and matching keys, a secure communication link spanning from the guide device to the invitee device over the first authorised communication channel; and associating, at the verification system, the secure communication link with the guest profile.

15 Claims, 10 Drawing Sheets

(56) References Cited

U.S. PATENT DOCUMENTS

| | | | |
|---|---|---|---|
| 2010/0009666 A1* | 1/2010 | Kim | G06Q 10/02 |
| | | | 455/417 |
| 2012/0265697 A1* | 10/2012 | Tuchman | G06Q 30/016 |
| | | | 705/304 |
| 2013/0275165 A1* | 10/2013 | Udagawa | G06Q 10/02 |
| | | | 705/5 |
| 2014/0100895 A1* | 4/2014 | Chen | G06Q 10/02 |
| | | | 705/5 |
| 2015/0058050 A1* | 2/2015 | Tebourbi | G06Q 30/02 |
| | | | 705/5 |
| 2015/0271163 A1* | 9/2015 | Greenspan | H04L 63/18 |
| | | | 713/168 |
| 2016/0328662 A1* | 11/2016 | Vinod | G06Q 10/02 |
| 2016/0364815 A1* | 12/2016 | Miller | G06F 16/248 |
| 2017/0213161 A1* | 7/2017 | Moati | G06Q 10/02 |
| 2017/0349193 A1* | 12/2017 | Fischer | B61L 15/0027 |
| 2018/0176017 A1 | 6/2018 | Rodriguez | |
| 2019/0318276 A1* | 10/2019 | Rouveure | G06Q 10/02 |
| 2020/0118226 A1* | 4/2020 | Agarwal | G06Q 20/3278 |
| 2020/0294047 A1 | 9/2020 | Sun | |
| 2021/0065075 A1* | 3/2021 | Koshy | G06Q 50/14 |
| 2021/0133641 A1* | 5/2021 | Valverde, Jr. | G06Q 10/025 |
| 2021/0350479 A1* | 11/2021 | Lurie | G06Q 50/14 |

\* cited by examiner

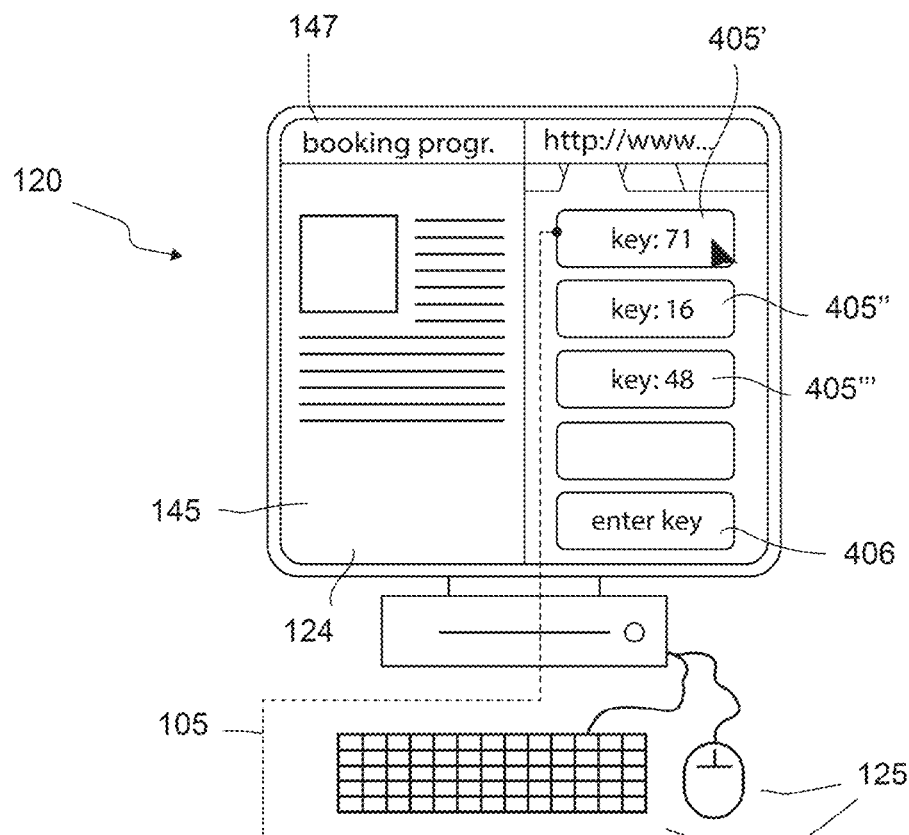
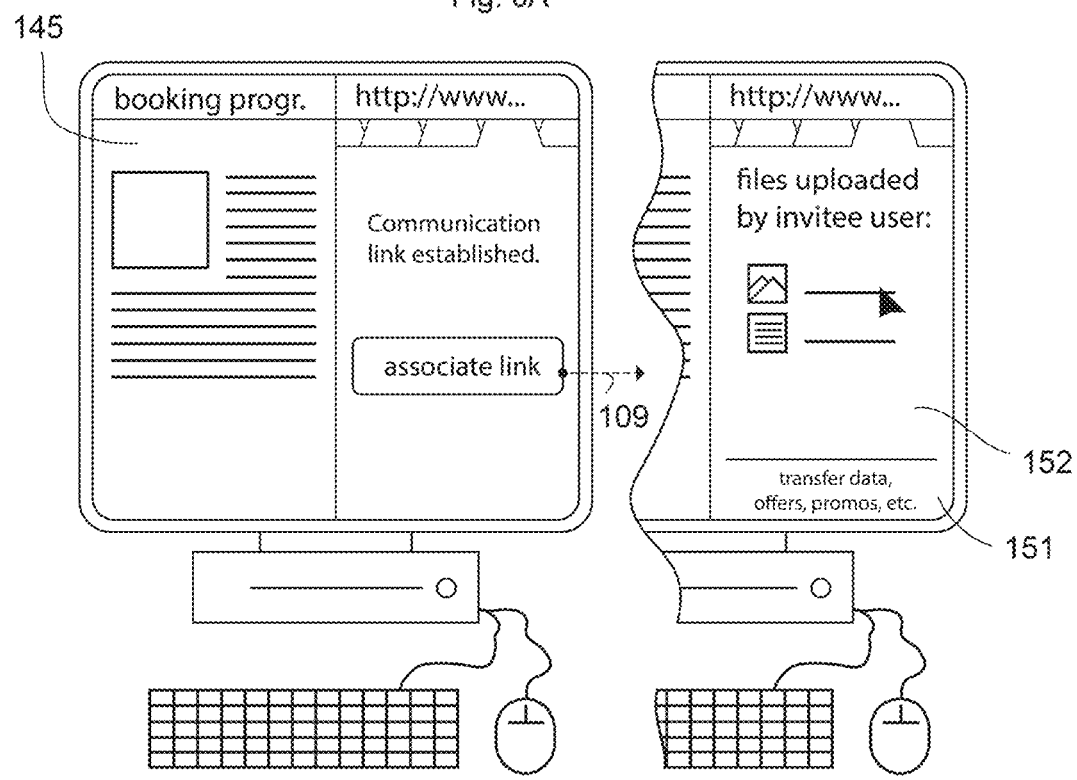
Fig. 6A
Fig. 6B  Fig. 6C
Fig. 6

METHOD OF ESTABLISHING AD-HOC DEVICE-BASED TRUST

CROSS REFERENCE TO RELATED APPLICATIONS

This application is a continuation of International Application No. PCT/DK2020/050303 filed Nov. 6, 2020, which claims benefit under 35 USC § 119 of Danish Application PA201970686 filed Nov. 8, 2019, the entire contents of both of which are incorporated by reference herein.

BACKGROUND

1. Field of the Invention

The invention relates to a method and system for providing ad-hoc trust between unfamiliar electronic devices for secure exchange of sensitive identity data.

2. Description of Related Art

More and more people keep their data stored on personal electronic devices for various purposes such as security, convenience or even a desire to declutter physical space.

Increasingly, businesses may benefit from leveraging this integration such as making it even more convenient for a customer or guest to onboard their systems.

One field, where such digital integration is seeing growth, is the hospitality industry. Hotels, resorts, hostels, tourist attractions, restaurants, bars, and other hospitality locations may benefit in various ways from making it easier for users to access their services. Benefits include being able to promote their products to potential customers.

One hurdle is the sensitive nature of the information that needs to be exchanged between mutually unknown people and their electronic devices. Guests are increasingly reluctant to open their data up to potentially insecure requests for data. For some users, this reluctance makes providing quality service with existing solutions infeasible.

Thus, there is a need for a solution that overcomes these challenges.

SUMMARY

It is the aim of the current invention to alleviate at least some of the above-mentioned problems. This is achieved by a computer-implemented method as follows. A computer verification system is used for establishing ad-hoc trust between two other devices: an electronic guide device of a guide user and an electronic invitee device of an invitee user to exchange sensitive guest data. The method comprises receiving a request from a guide device for data pertaining to a specific guest profile having at least guest booking data, the request comprising guest name-level data, said guide device and verification system communicating through an authorised first communication channel. Then, a guest booking confirmation is transmitted to said guide device.

Then the guide user may direct the invitee user to use the invitee device to visit a homepage to facilitate the process. In any regard, a connection request is then received from the invitee device through an internet browser accessible public access portal, thereby providing an unverified second communication channel between the verification system and the invitee device.

As a response, this connection request prompts the generation of two unique and matching keys.

A first of said matching keys is transmitted through the authorised first communication channel to the guide device, while a second of the matching keys is transmitted through the unverified second communication channel to the invitee device, where the keys are expressible through sense output means of said devices, thereby providing keys on both devices for sensory comparison and verification by said guide user. The keys may be expressible through the screens, for example.

Then, a verification signal is received being indicative of a successful key-match performed by the guide user thus prompting verifying the second communication channel for exchange of sensitive data. Thereby, a secure communication link is formed spanning from the guide device to the invitee device over the first authorised communication channel, to and from the verification system and trough the second now verified communication channel.

Thereby, in very short terms, a method is provided that is invitee user initiated and guide user controlled and allows secure and personalised data exchange between the invitee user device and a verification system associated with the guide user during establishment of a guest profile in a hospitality system. The invention allows a user-friendly check-in process that is furthermore secure and sanitary.

In a bit more detail, the benefits are discussed below.

Large booking platforms have come to hold most of the booking process information which leaves the individual venues without much guest information. This may confuse guests, if they believe that provider systems are integrated, and may scare them initially that their booking has been lost or not gone through. Since the confrontation takes place in the reception, this puts the venues at a disadvantage and may make them seem unprofessional to guests. Guests may be confused as to why the venue does not have more of their information from the booking platform, and the process of asking for all of their information anew constitutes a step back in the customer journey. By onboarding the guest using the method of the invention, the guest is allowed to integrate their information and be onboarded quickly and seamlessly. This enhances the customer experience and is user-friendly. It further reduces the number of mouse-clicks necessary for the receptionist while allowing parallel onboarding processes to take place simultaneously. It is furthermore touch-free (compared to a check-in panel) and retains sensitive information in the hands of the guest (compared to handing these over to a receptionist or entering them on a check-in panel). This is both more sanitary and data secure.

A more secure solution is achieved, where guests do not need to expose their identity documents to a stranger. Further, malicious third parties present in the room are disallowed from stealing or overhearing and using identity documents and identity-level data. Even further, since a connection is initiated by an invitee user but needs to be verified by a system insider in the form of the guide user, it is impossible or at least very difficult to gain access to the digital data from the outside, such as by a hacker, since access to the system requires guide user consent. Yet further, since the data exchange channel connects the devices relatively directly, it avoids exchanging sensitive information over insecure e-mail servers and pathways as well as insecure SMS or MMS type signals that have been shown to be insecure. Further still, since the devices are thus connected in the end by the first and second channels, the invitee user can thus input their own identity-level data on their own invitee device, which reduces the number of eyes on the documents to a minimum, and the guide user only sees the data needed for the transaction.

For these reasons, the method allows a very secure data exchange.

Further than data security, the method also increases convenience and trustfulness over conventional methods. By providing a public network portal such as a web page, the invitee user simply asked to perform an action which s/he has performed many times before. S/he does not need to install applications or sign up to any online services to get behind a password wall. If s/he has a web browser installed, s/he can participate as invitee users. Since the method further gives the invitee user the initiative, s/he has the technical facilities to stop the method at any time thus strengthening his/her sense of agency and trustfulness. By then providing a simple key for comparison to pair the devices to an invitee user, the method is as simple as taking a queue number at a bakery.

For the guide user as well, matching keys and associating communication links with guest profiles is an easy process. The guide user is provided with an overview list of keys for invitee users, who currently visit the portal, which becomes a help in a busy work environment. If a large number of keys are generated, it may indicate that another guide user should help invitee users. For example, it is possible to imagine that a guide user is performing another duty, when s/he receives a key, possibly with a notification. This would notify them that an invitee user wants their attention or that a threshold of invitee users has visited the portal thus indicating that a large number of guests are in the lobby and that their colleagues need assistance.

Taking this point further, the method frees a guide user from the front desk since s/he no longer needs to input large amounts of invitee user data into his/her computers. S/he can now receive invitee users in a lounge or sofa area thus relying on tablets or smartphones or other smart devices as guide device. In fact, s/he only needs to accept a key match and enter name-level data. After that, the communication link is associated with the invitee user/guest, who can then enter his/her own information faster and more securely. Front desk-less hospitality venues can thus be imagined, freeing up prime real estate for better use. A receptionist can then take on more of a host role.

For these reasons, the method allows a very convenient data exchange.

The keys are transmitted to the guide device and the invitee device, and to the latter over the internet browser used to access the public access portal. Therefore, it is necessary that the key is transmitted in a format, which web browsers can understand, and converted to a key that can be sensed, such as images or text, or preferably numbers.

A public access portal is thus provided by the method and system. Such a portal is conveniently a public internet address accessible by anyone with access to the internet. This ensures that any user with a device, which can access the public internet, such as a smartphone, a tablet or a computer, can access the portal. This ensures a safe environment of the invitee user to proceed through the method without actual or perceived loss of control of their device.

Importantly, the internet browser can be a general internet browser likely already installed on the invitee user device that allows a user to browse the public internet freely, conveniently through an address bar. The internet browser can also be a specialised internet browser that is restricted to a part of the public internet, such as an app.

It is an instrumental part of the invention that the keys are sensorially comparable by the guide user. This means that the keys are not keys in a cryptographic sense but rather for example short numbers, words, sounds, or simple images.

In an embodiment, the keys are simple keys. The keys being simple keys denotes that to validate that the keys match, they can be communicated from an invitee user to a guide user by stating/saying the key aloud or by showing the invitee device screen to the guide user. This assumes that both users are neurotypical. The key can be parsed and understood quickly and communicated simply. It takes only a few seconds, such as less than 10, five or three seconds to complete either process. Simple keys are any of sounds, words, short numbers, or simple images, preferably words, short numbers, or simple images.

In an embodiment, the keys are expressed as words. In an embodiment, the keys are expressed as jingle-type sounds. In a preferred embodiment, the keys are expressed as short alphanumeric codes, such as words or such as four or fewer unique random characters, preferably two or fewer unique random characters. In an embodiment, the keys are expressed as short numbers, such as three or fewer unique characters. In an embodiment, the keys are expressed as short numbers, such as a two-digit number.

In an embodiment, the method is performed by a computer verification system being different from said guide device and being different from said invitee device.

The method is used between users that are physically near to each other and interacting socially to verify the identity of a data exchange channel and to ensure that it is tied to the specific user whom it concerns. This requires that the guest user provides name-level data to the other user.

In an embodiment, the guide user being a hospitality worker asks the guest to provide name-level information to identify himself or herself such as for a booking or reservation. When the guide has name-level data about the guest, the guide user checks in the verification system that such a person has been created/has made a booking.

The guide user is a systems-affiliated user, who is connected to the verification system for safe data exchange with others. It may be a hospitality worker such as a receptionist, a host or a server, whose device is connected securely through a trusted connection to the verification system. The guide user may also be a private person who frequents hospitality venues and has a digital guest profile that s/he want to use with such venues.

The invitee user is person not previously affiliated with the verification system, and who, during the process, may be interacting with the verification system for the first time. The invitee user may be reluctant to share his/her identity-level data with other people. The invitee user is then invited to interact through the verification method of the invention to allow digital data exchange and to ensure safety therein.

Either the invitee user or the guide user will be the guest, or one of the users acts as legal guardian of the guest. The guest may be thought of for practical purposes as either of the two users.

By keys matching is meant that they fit together in a logical manner. Conveniently, they are identical, but they are not necessarily identical. They may match according to another scheme that is useful and user-friendly for the guide user to understand in a busy work environment. The two matching keys being generated may obviously be a single key that is then transmitted twice. In an embodiment, the matching keys are identical.

By keys being unique is meant that before a key is generated, currently existing keys are precluded from generation, such as consulting a blacklist of currently pending key sets. If for example keys are generated, for a given hospitality venue, from 00-99 and '15', '23', '30', '71' and '73' are already pending being matched, a newly generated set of matching keys will not be able to generate one of the shown numbers.

When communication links are formed by matching the keys, keys are erased from the blacklist and can again be generated by a new portal visit, possibly after a freeze period.

Hospitality venues already use booking systems to identify guests that enter their establishments as having a booking. The method integrates with the data of those systems. What is termed the verification system throughout this disclosure covers essentially a verification part performing the key-generation and a booking part holding the guest information. It is at least possible that the booking part with guest name-level data and guest profiles are physically separated from the verification part. For the purposes of the present disclosure, these two possibly disparate systems will be discussed as a single verification system comprising both parts.

By name-level data is meant publicly available data about a person that can be used to reasonably identify the person. The purpose is to have data provided by the guest that is conventionally shared in conversation. Other than names it might be physical address, birth day, birth month, phone number or aggregate thereof, or email address. A first name will often suffice and is preferable. In an embodiment, name-level data is the name of a person.

Identity-level data is personally identifiable information. Social security numbers, photo identification, driving license, passport, payment cards and other such sensitive data are all considered identity-level data. When the communication link is formed and assigned to/associated with the guest profile, it is safe for exchange of such identity-level data.

Location-type data is data about a person that is available to anyone near him/her, such as their geo-location or a coded sign in a room. An invitee user may thus be asked to share location data on his/her devices. Alternatively, an invitee user, who directs his/her device to the public access portal, may be asked to write a specific code or answer a short riddle on the device, whose answer is provided adjacent to the public access portal. It may be a drawing of an animal or a colour or some such simple object, or a short series of such.

In some places, the specification discloses providing the communication link at the same time as the keys are generated. For these instances, it is to be understood that the communication link is still not verified before the keys are matched. In embodiments congruent with all embodiments disclosed in the application, the communication link may be considered to be generated in conjunction with key matching instead. It is also to be understood that the communication link is a connection between the devices and that it is provided along the communications channels. It can be thought of as a connection specifically between the two connected devices involving the verification system, but not third devices. When the use for the communication link is no longer present, it may be discarded. Thus, it uses the first and second communication channels, but is not the communication channels.

The verification system is disclosed as both holding the guest booking data and performing the key generation. Naturally, it is understood that the verification database and the verification processor are not necessarily a unitary device. In particular the verification database may be divided: it may have some data in conventional databases integral to conventional public management systems and other, method-specific data elsewhere. The latter specific database may be adapted to make and hold copies of the relevant parts of the former or to communicate with it in real time to perform the steps of the method.

By a receptionist is to be understood as an exemplary hospitality industry worker whose job is eased by the method. In principle, any other hospitality worker may be substituted, such as waiters, bartenders, flight attendees, resort personnel and hostesses.

Venue, hospitality location and other terms like these are used interchangeably in the application to denote the physical facilities/apparatuses which one of the users represent, and with which the other user has purchased a service, and further ultimately with which the latter user desires to exchange identity-level data. Typically, the exchange takes place in order to gain access to the services of the facility. Myriad examples are given throughout the application. A non-exhaustive list is hostels, tourist attractions, restaurants, bars, hotels, airports, cruise ships, fitness centres and car and boat rental.

In an embodiment, the formed communication link is associated with the guest profile. Thereby, identity-sensitive data exchange is made guest-specific through said communication link.

In an embodiment, either user is connected to a hospitality system having booking information on guests, and where said name-level data is retrieved from said hospitality system. Thereby, the method can be used with conventional guest data management systems or public management systems.

In an embodiment, the invitee user is the guest. Thereby, a seamless onboarding of a guest is achieved. Further, this allows the receptionist user to hold the control of several such ad-hoc trust processes simultaneously.

In another embodiment, the guide user is the guest. Thereby, a guest is allowed to retain their identity-level in bags or pockets and instead share digital documents with a receptionist or other person.

In an embodiment, the guest is either of the invitee user or the guide user.

In an embodiment, the verification system receives said guest profile and name-level data as part of a booking procedure prior to receiving a request for name-level data from the verification system as part of a booking. Thereby, the guest profile is previously created, and the receptionist can easily check whether a booking exists for the user.

In an embodiment, the keys are transient in the manner that they are set to expire when either of the following conditions are met: the second communication channel is verified; or a duration has passed since key generation, such as after 24 hours or less. Thereby, the keys are deleted/expire after they have facilitated the establishment of device trust as well as when not used to do so. This further helps ensure that the system has spare keys from which to generate, when a new guest arrives, while the keys can be simple keys. This at least reduces the number of mouse-clicks necessary for the receptionist, who would otherwise have to delete the keys manually. It is furthermore clear from this that the keys used are not user-profile types of cryptographic keys. In embodiments thereof, the duration, which the transient key exists after generation before expiring, is a month or less, a week or less, two days or less, 24 hours or less, 18 hours or less, 12 hours or less, 6 hours or less, 4 hours or less, 2 hours or less, 1 hour or less, 30 minutes or less, 25 minutes or less, 20 minutes or less, 15 minutes or less, 10 minutes or less or five minutes or less.

In another embodiment, the method is preceded by the guest entering a venue and creating a booking with the receptionist, after which the booking is then transmitted to the system. Then, with a booking in the system, the method can begin as otherwise described.

In an embodiment, wherein a blacklist of precluded keys is consulted before a set of matching keys are generated to ensure that none of said precluded keys are generated, then the matching keys are added to the blacklist when they have been generated, and finally the matched keys are removed from the blacklist, when the keys are matched by the guide device. Thereby, sets of keys are unique.

In an embodiment, wherein the invitee device is attempted partially identified before a set of matching keys are generated, where a set of locally unique keys are generated if said partial identification is successful, and otherwise a globally unique keys are generated. Thereby, the guide user already knows from the type of key, whether a user is partially identified. Further, local keys can be attributed to the venue in a manner that a global key cannot feasibly be, and so it is allowed that any local keys are displayed for the guide user to see and select between. Furthermore, this allows any invitee user, who does not have a device with such partial identification capabilities or who does not want to, or fails to provide such data, to still make use of the method by using a global key.

Locally unique keys have an identifier that separates them from other keys, such as a geolocation range. It may be a city, a street or a single venue. In an embodiment, the identifier can be a slightly altered public access portal address being a local access address. The local access address is then unique to the venue with which the guide user is affiliated.

In an embodiment, said attempted partial identification is performed by requesting the invitee device to share location data with said verification system. Thereby, proximity between devices can be ensured. This may for example identify the most likely venue, and possible guests can be greatly narrowed down for the guide user.

In an embodiment, said associated communication link is used to request identity-level data of said guest from the invitee device to further fill out the guest profile as part of a check-in procedure of a hospitality venue, and then transmit said identity-level of said guest from said invitee device. Thereby, a whole check-in procedure can be performed through the established trusted channel.

For example, a queue of users may all be loading the portal in turn, and after they have communication links associated, they can stand to the side in turn while they fill out forms on their devices themselves without passing the documents to the guide user. This then frees the guide user to help the next invitee users. Since the communication link stays associated with the guest profile until terminated by either party, an invitee user, who is stuck, may prompt a helpful comment from the guide user, who can follow the check-in process through his/her guide device.

In an embodiment, the address of the public address portal is provided as an electronic tag directing the invitee user to the public access address, where the tag is in the same room as the guide device. By an electronic tag is meant an RFID-tag or NFC-tag or other such physical device. Thereby, providing the access portal becomes even easier and it becomes easier for users to access the portal.

In an embodiment, the tag is a passive tag molded into another device such as a mat for lying on a receptionist desk. Thereby, the tag is unobtrusive, durable and easy to use.

In an embodiment, the electronic tag is a local tag unique to the venue, where the electronic tag is located. This serves as partial identification as described above and thus allows the method to generate local keys without asking users for location-level data.

In an embodiment, at least two unique connection requests are received through the public access portal by at least two invitee devices to generate a corresponding number of unique and matching sets of keys, where the first keys of each set generated by said connection requests and transmitted over said first channel to said guide device are displayed for selection next to each other on a key-screen of said guide device. Thereby, a guide user, such as a receptionist, can get a sense of the number of people readying to check-in or use another such service at a glance at the device key-screen. At the same time, the guide user can review the keys and select them in turn as invitee users advance.

In an aspect of the invention, it relates to a data processing system with means for carrying out the steps of the invention.

In an aspect of the invention, it relates to a data processing verification system having a processor adapted to perform the steps of the invention.

In an aspect of the invention, it relates to a computer program comprising instructions which cause the computer to carry out the method of the invention, when the program is executed by a computer.

In an aspect of the invention, it relates to a computer-readable medium comprising instructions which cause the computer to carry out the method of the invention, when executed by a computer.

BRIEF DESCRIPTION OF THE DRAWINGS

In the following, example embodiments are described according to the invention, where:

FIG. 6 is a wireframe diagram of the guide device views during a method of the invention;

DETAILED DESCRIPTION

In the following, the invention is described in detail through embodiments thereof that should not be thought of as limiting to the scope of the invention.

Figure 1:
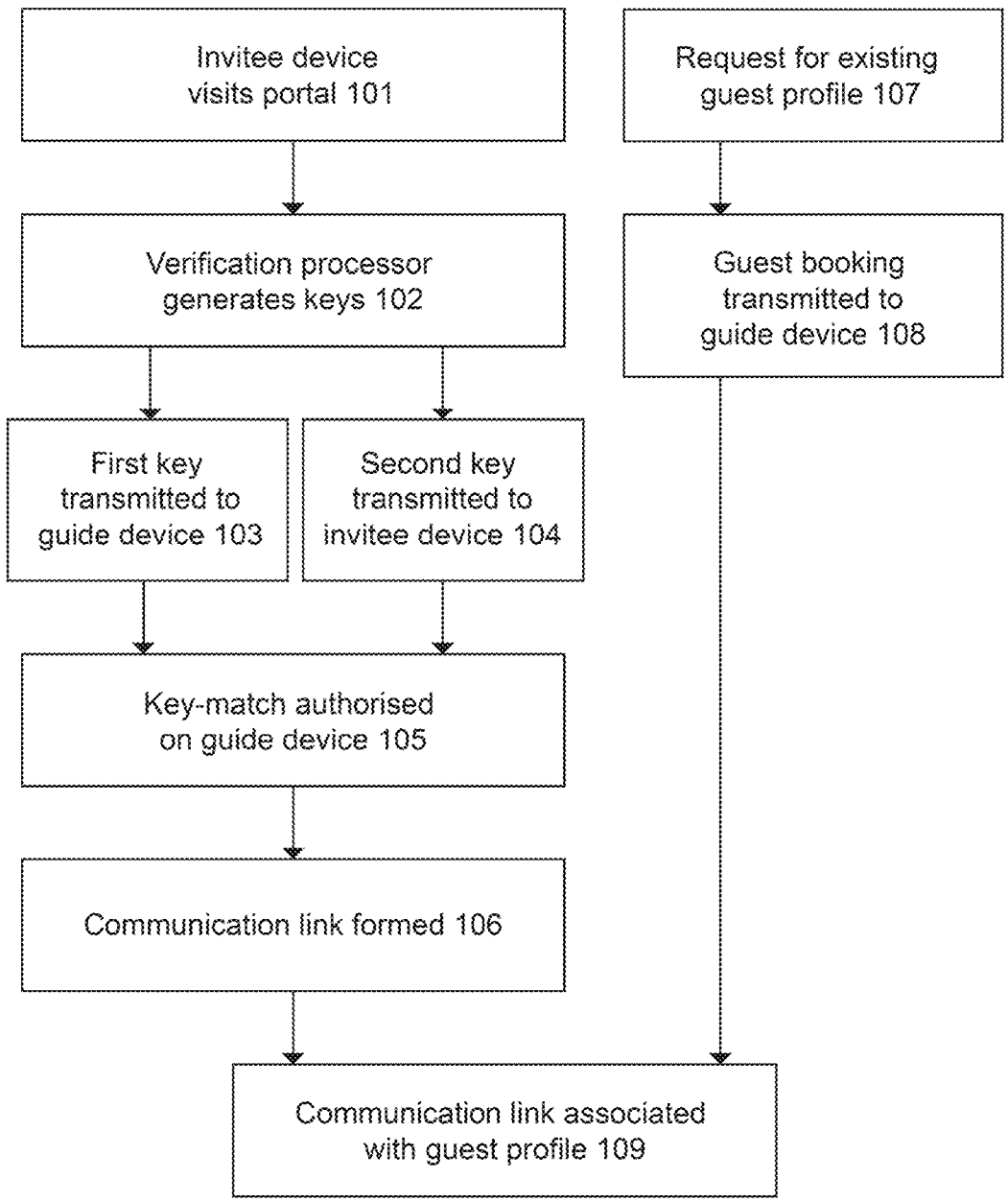
FIG. 1 is a process diagram illustrating the method according to the invention.

FIG. 1 is a process diagram illustrating the method according to the invention. The method allows dual consent during setting up a secure data transfer channel between a guide user with a guide device that is pre-authorised with the verification system and an invitee user who does not know it beforehand.

In general, the method plays out between two people who do not know each other, each with an electronic device, and where at least one of these two users have sensitive data to share with the other. A guest is associated with one of these users and has booking information in a verification system that is connected to a guide device of a guide user through a first authorised connection. The guest may be one of the two users, or it may be a third person being assisted by one of the two users.

As the guest enters the venue, the receptionist or other hospitality worker asks the guest for guest name-level data to start the check-in process. Then, the guide user uses the guide device for requesting 107 guest profile data from the verification system, including any guest booking data. If a booking exists, a booking confirmation is transmitted 108 to the guide device.

Sharing name-level data is not typically a concern. However, a guest may be reluctant to share sensitive information. Then, the guide user invites the invitee user to visit 101 a public access portal via the invitee device. This is less intimidating than giving away personal identification items such as passports and driving licenses, not least because the invitee user can abort the process at any time.

When the invitee user visits the portal via the invitee device, the portal communicates to a backend verification system which generates two matching and unique keys. An unverified communication link may be formed here as well.

One of the matching keys is transmitted 104 to the guide device through a first verified channel.

The other key is transmitted 105 to the invitee device through a second channel to the web page and the invitee device. Thus, when the invitee user visits the public access portal via the invitee device, s/he sees such a key emerge on the screen of the invitee device almost immediately.

Then, the guide user asks the invitee user to show their screen to the guide user or to say the key out loud, whereby the guide user can authorise 105 that the two transmitted keys match, i.e., that the key received by the guide device corresponds to the key received by the invitee device. This authorisation verifies the connection between the verification system and the invitee device.

Thereby, a communication link is formed over the authorised first communication channel and the now verified second communication channel to link the two devices. This is possible because the guide user has verified that the connection, which is established, is indeed to the invitee device. This forming of the communication link thus serves to verify that the electronic connection, which is being requested over the network, is indeed made by the invitee device.

The communication link is then associated 109 to the guest profile by the guide user on the guide device.

Thereby, the guest is only required to expose publicly available name-level data out loud in the room in which the method is carried out. Passport, driving license and other such items never need to be exposed. At the same time, the integrity and security of the connection is ensured for transfer of further sensitive data.

Furthermore, the invitee user has the initiative and can see the method progressing on his/her own device, thus making the process more trustworthy. The convenience of this is facilitated by providing a public access portal for the invitee user to access. Because the guide user is in control, after the invitee user has accessed the portal, any malignant parties prodding at the system through digital channels will be stuck after generating keys that the guide user can simply ignore. Also, if several guests are visiting the public access portal at the same time, they will all be provided with unique keys, and the guide user can form each communication link to verify each channel individually by selecting the key on the guide device that matches an invitee user key at a given time.

Thus, the security of the method is enhanced greatly, since the guide user is presented with each individual connection request and can accept them in turn and then associate them in turn with each individual guest as he/she provides enough data to be identified in the system.

Figure 2:
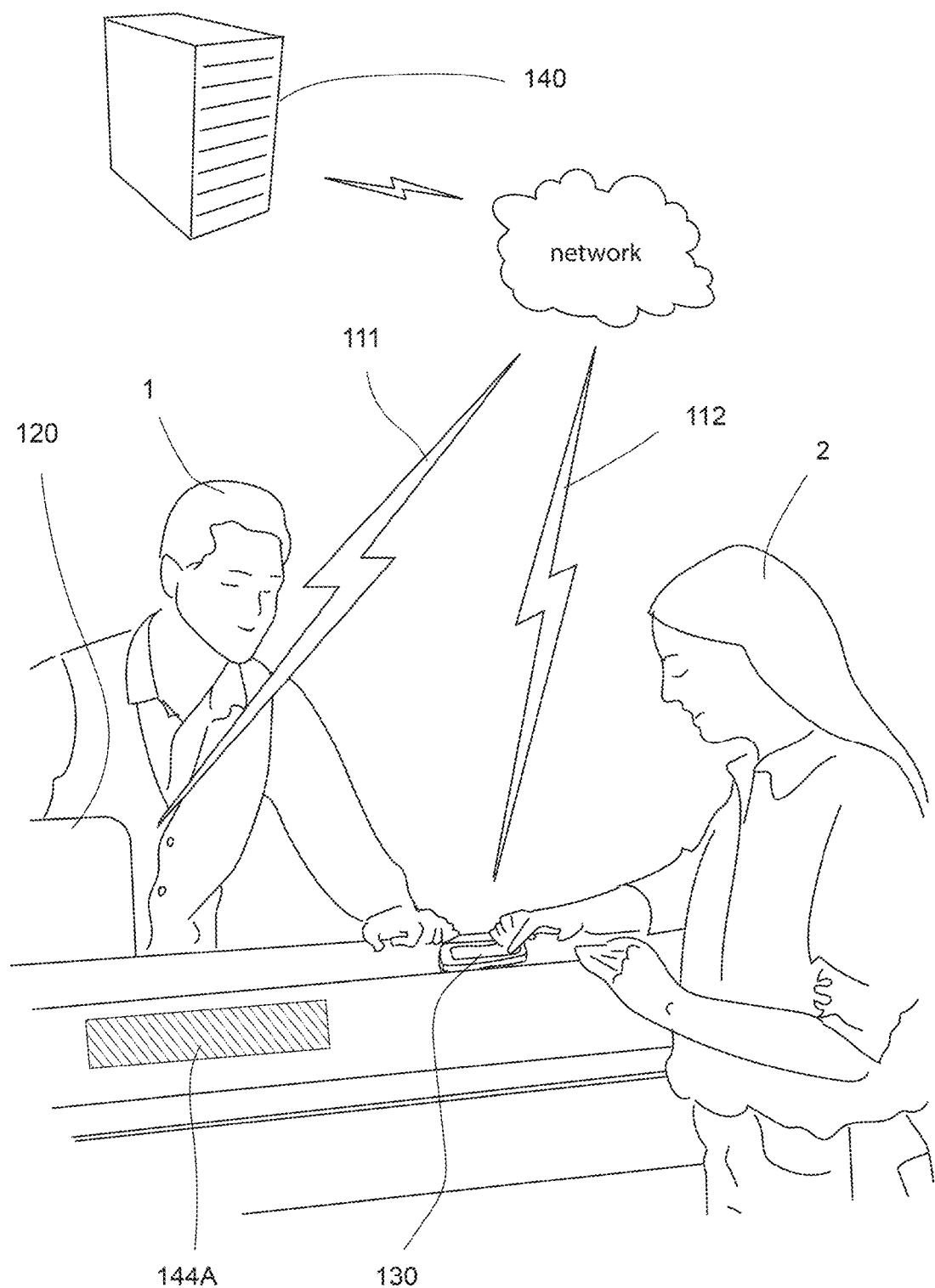
FIG. 2 illustrates the method used in checking in at a hotel according to the invention.

FIG. 2 illustrates the method used in checking in at a hotel according to the invention. A simple example here shows how user-friendly the method is.

An invitee user 2 is here a hotel guest. When the hotel guest 2 enters the lobby of the hotel and approaches the front desk, s/he is greeted by a receptionist 1. After providing his/her name, the receptionist confirms that a booking exists in the name by requesting name-level data from the verification system and receiving back guest profile data. Then, the receptionist asks the guest to use his/her invitee device 130, here being his/her smartphone 130, to visit the public access portal.

A tag 144A has an NFC chip embedded in it, and s/he only needs to move his/her phone close to the tag 144A to be provided with the address of the public access portal. In another embodiment, the address can simply be provided as a more traditional visual web address on the tag 144A. One preferable embodiment has portal address in an NFC chip in a mat on the front desk, so a guest merely places his/her phone on it to visit the address.

In any case, when s/he visits the portal, his/her smartphone 130 communicates over a network to a verification system 140 thus forming a second communication channel 112. The verification system generates two matching and unique keys as well as the data exchange communication link in response to the connection request by the smartphone 130. One key is transmitted through a first channel 111 to a guide device 120 being in this example a computer of the receptionist, while the second key is transmitted back through the second channel 112 to the smartphone.

Then, the receptionist 1 asks the guest to put his/her smartphone 130 on the front desk, where the receptionist verifies that the key on the smartphone 130 matches one on the screen of the computer 120 of the receptionist. By then forming a communication link and associating it to the pre-created guest profile, the receptionist and guest can now safely exchange sensitive data with each other and with the verification system.

Figure 3:
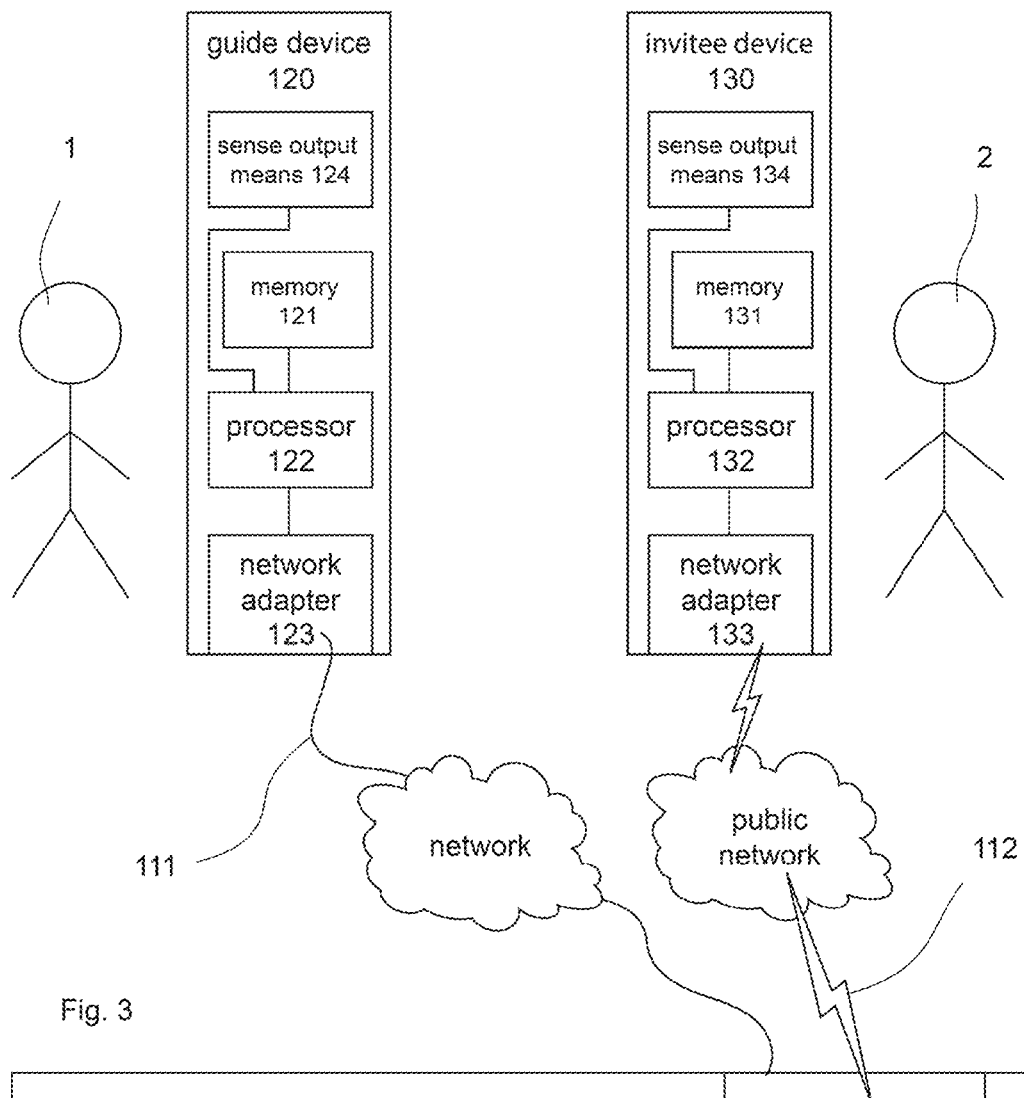
FIG. 3 is a device and network schematic of the devices of the invention.
Figure 3:
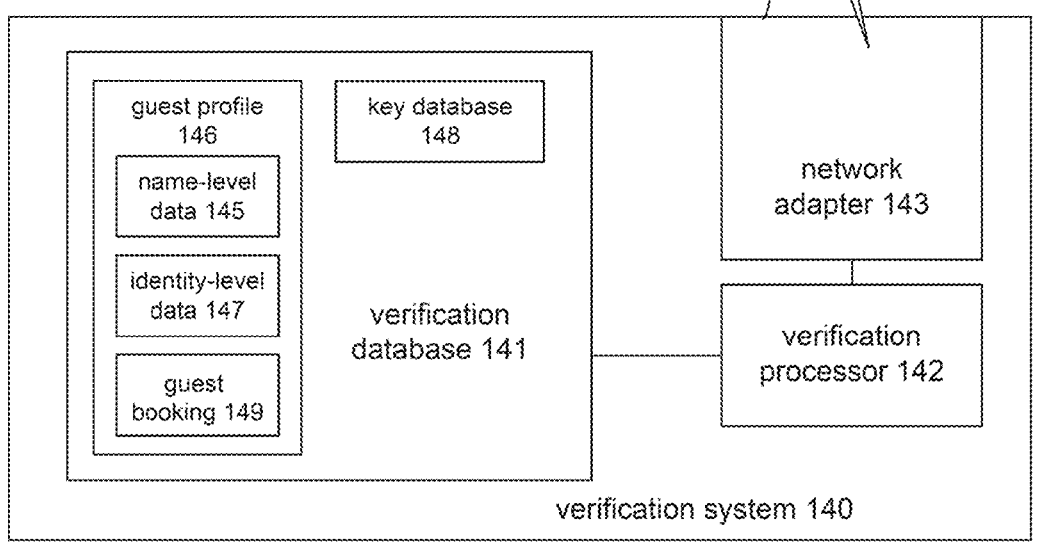

FIG. 3 is a device and network schematic of the devices of the invention. FIG. 3 illustrates the various electronic devices used in the method as well as how they communicate. The verification system 140 has a database 141 that holds all the guest profiles 146 with associated name-level data 145 and any identity-level 147 data that may already be gathered. The guest profiles 146 may comprise a varied amount and level of guest information and detail depending on how much a guest has filled out during a booking, which system was used when making a booking, and so on. The method is very useful in that it does not require that a guest profile 146 comprises any specific data-fields. What is important is that there is at least one name-level datum 145, preferably first name and also preferably last name. The guest profile 146 data may comprise a guest booking 149. If the guest profile 146 data comprise a guest booking 149, the verification system 140 will transmit a confirmation on a request thereto to the guide device when prompted.

Further, the verification database 141 has a key database 148 that has the rules for key generation under various circumstances as well as any lists of precluded keys. For example, two hospitality locations may have their own, preferred, local ruleset for generating keys. One location may generate between 0-99, while another may generate between 0-999. As the keys are generated, they are precluded until they have been used or alternatively discarded after a time to ensure that all sets of keys are unique.

The verification system 140 further has a processor 142 to perform many of the tasks of the method and a network adapter 143 to communicate with the devices 120, 130.

The verification system communicates over a first channel 111 to the guide device 120 being controlled by a guide user 1 and over a second channel 112 to an invitee device 130 controlled by an invitee user 2. The second channel comprises the publicly accessible portal that is accessible over the public internet. This ensures that it is easy for the invitee user to initiate the method. The first channel 111 may be provided as part of a local network, as a non-public network or through a public network but behind password protection.

The guide device has a network adapter 123 to communicate with the verification system 140, a processor 122, memory 121, and sense output means 124.

The invitee device 130 has a network adapter 133 to communicate with the verification system 140, a processor 132, memory 131, and sense output means 134.

The sense output means 124, 134 ensure that the keys can be expressed on the guide device 120 as well as on the invitee device 130 to allow the guide user 1 to verify that the keys match. Most electronic devices used by consumers will qualify, such as smartphones, tablets, stationary computers, laptops, and even smartwatches and other smart devices. Sense output means will typically be screens for visual inspection. It is also conceivable that an auditory key could be used, however.

Figure 4:
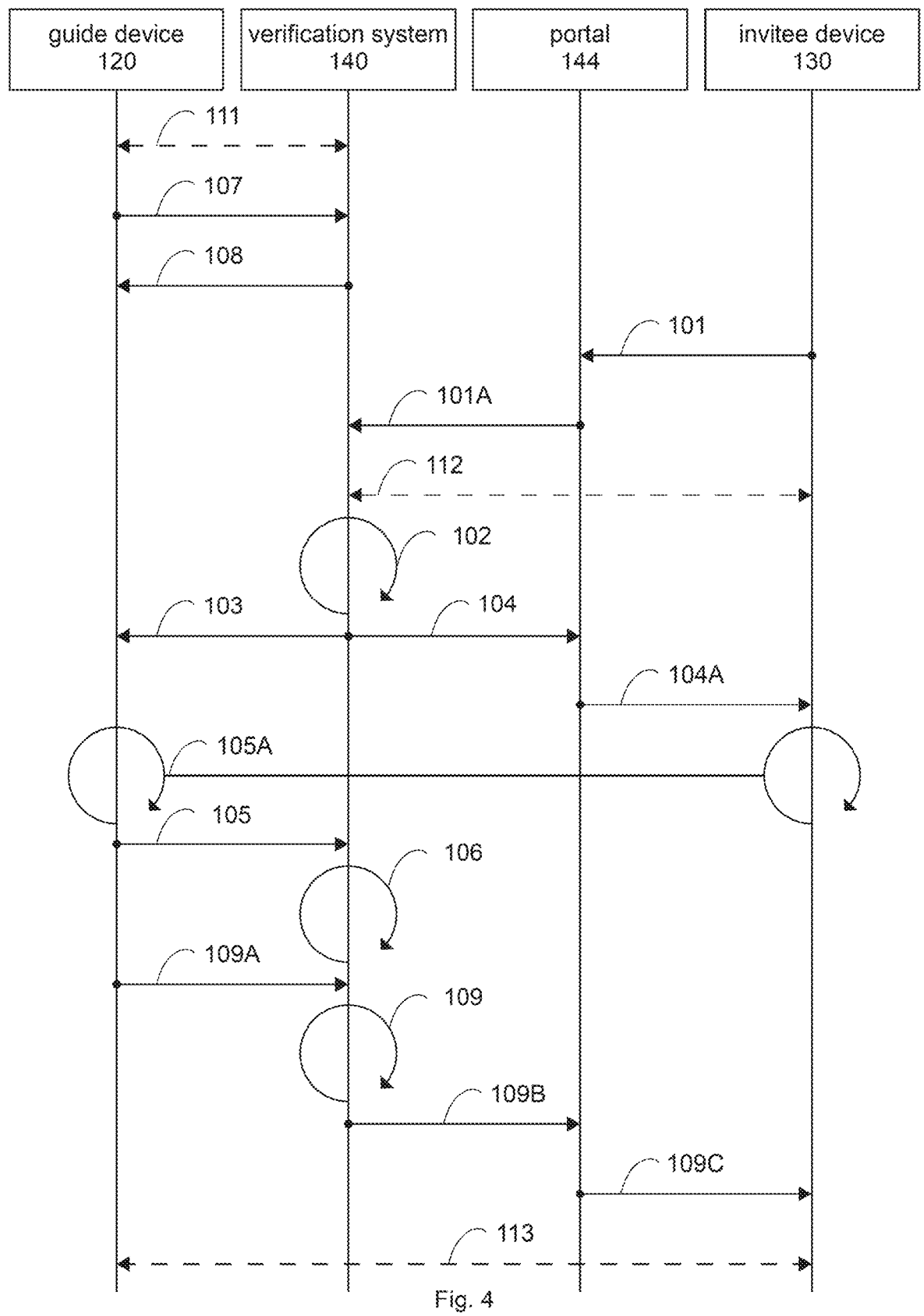
FIG. 4 is a sequence diagram of the method according to the invention.

FIG. 4 is a sequence diagram of the method according to the invention.

Before the process, which is shown in the sequence diagram, a guide user acquires name-level data from a guest. Then the guide user uses the guest device 120 to request a guest booking using name-level data 107 to find the user profile from the verification system 140.

If such data exist, the verification system 140 responds by providing 108 a booking confirmation to the guide device 120. The confirmation is transmitted over the pre-authorised first communication channel 111. The booking confirmation may take the shape of guest profile data and may have additional information associated therewith. Then, the guest profile 146 awaits on the guide device until required for further steps later.

Then, the invitee user is instructed to visit 101 the portal 144 using his/her invitee device 130. By visiting the portal, the portal is prompted to connect to the verification system 140 with a request 101A to generate 102 two matching and unique keys.

Then, the verification system transmits 103 a first of the two keys to the guide device 120 and transmits 104 a second of said two keys to the portal 144 from where it is transmitted 104A to the invitee device 130.

The keys are now expressed visibly/audibly on both devices 120, 130, and the guide user compares 105A the keys visually/auditorily to ensure they match and then transmits device verification signal 105 to the verification system 140 indicating that the keys match.

Then, the communication link is formed 106 by the verification processor. In practical terms, this means that the second communication channel is now verified to transmit sensitive data between the invitee device 130 and the verification system 140 through the portal 144. By extension, the communication link spanning the first and the second communication channels can be thought of as a direct communication link between the two user devices for easy sharing of sensitive data although at this point, the method has merely established an additional secure—verified—connection between the verification system and the invitee device, the former of which already had a secure connection to the verification system. Nevertheless, the communication link is described throughout as spanning both communication channels, when the second is secured.

Now, the guide user has a formed and associated communication link between the two devices 120, 130 as well as a retrieved guest profile matching the person with the invitee device. Then, the guide user requests 109A the verification system to match the two 108, 106.

Then, the verification system associates 109 the previously retrieved guest profile to the communication link indicated by the guide user. This associating 109 comprises the verification system 140 allowing the formed communication link between the invitee device 130 and the guide device 120 to inform the specific guest profile for safe data exchange through the portal. The associating 109 is then transmitted to the portal 144 and to the invitee device 130 which receives, conveniently, guest profile data that implicitly confirms the success of the method in associating 109 the profile with the communication link.

Thereby, the invitee device is finally matched with the guest profile, and identity-sensitive data can be exchanged over the newly guest-associated and secure communication link.

Figure 5:
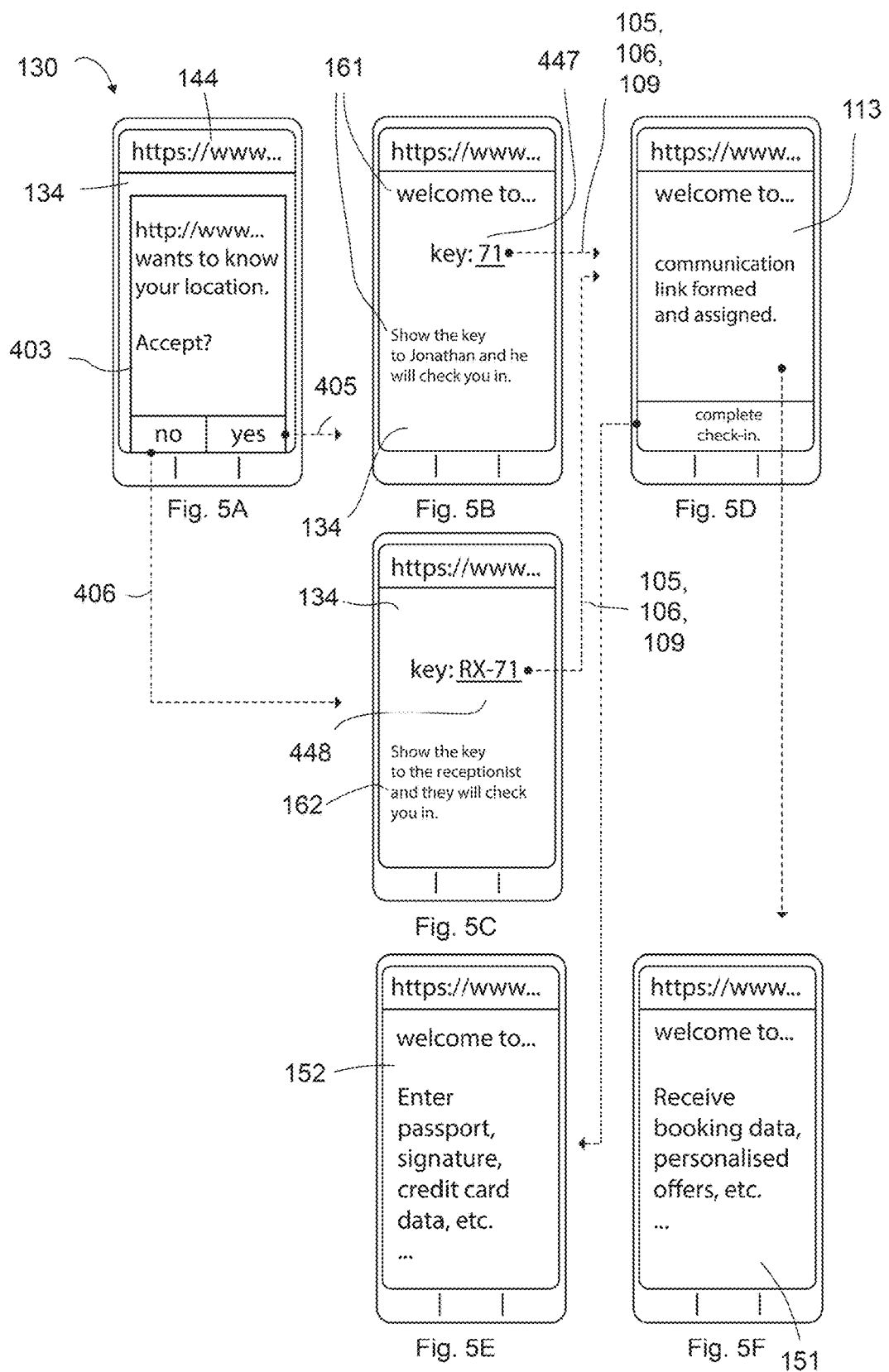
FIG. 5 is a wireframe diagram of the invitee device views during a method according to the invention.

The wireframe diagrams of FIGS. 5-6 are illustrative of a preferred embodiment of the invention, where a guide user is a hospitality staff guide user, and where an invitee user is a guest invitee user. For simplicity, the hospitality staff has been termed receptionist, but it could be any service industry staff, such as waiter, bartender, tourist guide etc. Variations from this example is given in places, where this is considered illustrative of wider scopes of the invention.

FIG. 5 is a wireframe diagram of the invitee device 130 views during a method according to the invention.

FIG. 5A shows an invitee directed to a web browser of their invitee device 130 to find the public access portal 144. The portal is thus shown through sense output means 134 of the device. The sense output means is here a screen 134. Instead of being shown a key immediately, the invitee user is asked to share location-level data with the verification system.

Since the verification system may generate matching keys for multiple guide users, it may be beneficial to perform a partial identification to simplify the keys needed, such as retrieving the location-level data of the invitee device 130.

FIG. 5B illustrates a view, where such location-level data request is accepted 405. This allows the verification system to know at which venue or hospitality place the invitee user is thus localising the verification process. For example, if a hospitality guest visits a hotel and accepts sharing location-level data, the portal may then provide localised content 161 and instructions already on the next screen thus welcoming the guest to the specific place as well as possibly referring to the receptionist by name. Even further, the verification system may generate a local key 405 being short, since they only need to unique locally. This allows a secure process that is user friendly and unobtrusive.

FIG. 5C illustrates a view where such location-level data request is not successfully accepted. If the user rejects the location-level data request, or if the invitee device 130 cannot provide sufficiently detailed data to the verification system for other reasons, a global key 406 may be generated and provided to the invitee device 130 through the portal. The global key is globally unique and thus likely needs to be more complicated. The shown example may not seem much more complex than the local key 405. By providing two case-insensitive alphanumeric digits and two numbers, a total of over 125,000 unique keys are provided that remain quite easy to manage between two users. Non-local instructions 162 may also be provided.

No matter which type of key is generated, the next steps are performed by the guide on the guide device and requires the key provided to the invitee device to be shown or told or otherwise provided to the guide user. If for example the invitee user puts his/her smartphone on the front desk for visual inspection by a receptionist, this is a comparatively non-threatening scenario for the invitee user if the alternative is doing the same with a passport, a credit card or such identity items. Saying the number out loud is even less obtrusive and for that reason, providing numbers or letters that can easily be put into words is beneficial.

FIG. 5D shows the next thing that appears on the invitee device irrespective of key type used. A confirmation of the establishment of a personalised and secure data exchange communication link is shown. Obviously, instead of such generic confirmation, the invitee user may be presented with their booking data from the verification system thus implying such personalised and secure connection or other practical data view.

The processes required between 5B or 5C and 5D is performed on the guide device and will be discussed in relation to FIG. 6.

When a secure and personalised communication link 113 has been established between the invitee device 130 and the verification system, identity-level data may be exchanged in either direction through this communication link 113.

As seen in FIG. 5F, if the invitee user performs no actions, a receptionist guide user or verification system may push identity-level data onto the invitee device such as special offers, promos, rebates, booking data, or choices among services. A guest guide user may instead push digital identification such as passport or driving license, payment information or other such identity-level data.

Conversely, as seen in FIG. 5E, the method also allows a guest invitee user to push identity-level data. A receptionist invitee user is allowed to provide any guest-specific data that may be compatible with such a data exchange channel.

FIG. 6 is a wireframe diagram of the guide device 120 views during a method of the invention. The illustrated example is a receptionist computer. Receptionists already use booking management systems 147 such as public management systems to manage guest data. When a guest approaches a receptionist front desk to check in at a hospitality location, the receptionist asks the guest invitee user for name-level data, and then input it to retrieve a guest profile 145 from the verification system. The guide device outputs information to the guide user through a sense output means 124 being here a computer screen. The guide user can interact with the guide device through input means 125, such as keyboard and mice.

After the guest invitee user has provided name-level data to allow the receptionist to find a guest profile 145, the receptionist guide user instructs the guest invitee user to visit the public access portal with his/her invitee device.

The receptionist guide user has a matching program or web page open that is also connected to the verification system though the first authorised channel.

FIG. 6A illustrates a view where three guests have visited the portal and generated local keys 405', 405" and 405'''.

When the guest invitee user visits the portal successfully and for some embodiments has further accepted sharing location-level data, a key is transmitted to the guide device 120 and expressed through the sense output means 124 being here a computer screen. The receptionist guide user then asks the guest invitee user what key they have or asks the guest to show their key. From the example given with FIGS. 5A-5E, such a guest invitee user may say '71'. Then, the receptionist checks if the guest has a matching key and if so, s/he may conveniently click it to transmit a device verification signal 105 that forms the communication link.

In the shown example, there are several keys present on the guide device which are generated by multiple users visiting the portal. This is not a problem, as the receptionist guide user can accept them to form communication links in turn as the receptionist sees fit.

For the example given in FIG. 5C, where a guest invitee user fails to accept sharing location-level data with the verification system, no key will preferably be shown on the guide device. Instead, the guide user inserts the key transmitted to the invitee user into an input field and compares against a hidden list of active global keys. When the receptionist guide user has then verified that the keys match, s/he requests from the verification system that the communication link be formed.

FIG. 6B illustrates a view, when a communication link is formed. Again, however, the keys are matched, and a secure data exchange channel has now been established between the devices. Then, the receptionist guide user associates 109 the communication link to the user profile 145 from the booking system, thereby providing a secure and personalised data exchange communication link 113 as shown in FIG. 6C.

As with FIGS. 5E and 5F, the receptionist guide user is now allowed to either transmit identity-level data 151 to the guest invitee user through the secure and personalised communication link 113 or to retrieve such data 152 from the guest invitee device as the guest provides it. Preferably, the receptionist guide device will have a progress indication related to the communication link that may allow the receptionist to provide check-in assistance to the guest without having to look over his/her shoulder. For example, when the communication link is formed, the guest invitee user may be moved through an intricate booking setup with digitalisation of a passport, insertion of payment data and so on which may be overwhelming for some guest invitee users.

It should be noted that the described order is preferable, namely to ensure that a prospective guest has a booking by requesting name-level data and retrieving a guest profile from the verification system in turn before comparing keys. For the method of the invention, it is not strictly speaking necessary to do it in that order. It suffices that a guest profile is retrieved from the verification system to provide a booking confirmation to the guide device before the communication link to the retrieved guest profile, and name-level confirmation could thus be performed as late as after a communication link has been formed.

Figure 7:
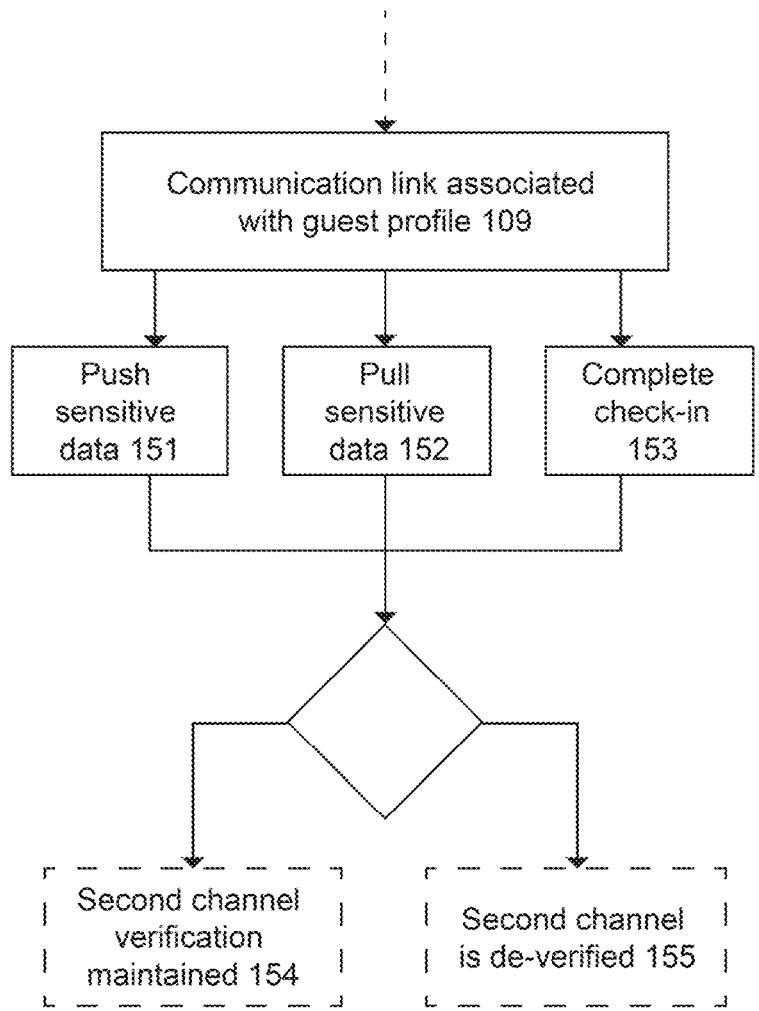
FIG. 7 is a process diagram of using the safe transfer channel according to the invention.

FIG. 7 is a process diagram of using the safe transfer channel according to the invention. When a communication link is associated 109 to the guest profile, identity level data can now be transferred safely between the invitee device and the verification system.

This is useful for pushing identity-level data from a verification system or guide user to an invitee user. In case a guide user is a receptionist guide user, identity data push 151 ensures that only the desired guests receive the promotions, coupons, notifications, codes to restricted areas, invitations and such. This may be based on a payment model or a premium membership model.

Furthermore, for a situation where a guide user is a guest visiting a location, which is not connected to the verification system, such identity data push 151 allows the guest invitee user to transmit identity data such as passport and identification documents as well as payment information over the secure and personalised communication link.

The personalised and secure communication link is also useful for pulling data from the invitee device and invitee user as discussed. Pulling is here merely an illustrative term, and the data may be requested verbally and then pushed, or it may indeed be pulled electronically, or other convenient method.

In case a guide user is a receptionist guide user, identity data pull 152 allows the receptionist guide user to request identity data such as passport and identification documents as well as payment information over the secure and personalised communication link.

Furthermore, for a situation where a guide user is a guest, who visits a location that is not connected to the verification system, booking data in existing data formats such as pdf files can be transmitted from the receptionist invitee device over the secure and personalised communication link to the guest guide device and user.

Another example of what such a secure and personalised communication link is useful for is to complete check-in 153. The method allows initiating complete digitalisation of the check-in procedure. Such a check-in is greatly improved by mutual exchange of both special offers, such as room selection and time-limited upgrade offers, as well as digitalization of the guest identity by filling out guest profile identity-level data fields. The check-in is thus a special case of both pushing 151 and pulling 152 data.

After initial identity-level data exchange is complete, the communication link can either be maintained 154 or de-verified 155. Maintaining it could be through installation of an application that maintains the connection or by providing a cookie through the browser to the invitee device or other technical implementation. Preferably, de-verification 155 can be performed by the invitee device by pressing a designated button thus enhancing the invitee user control.

Figure 8:
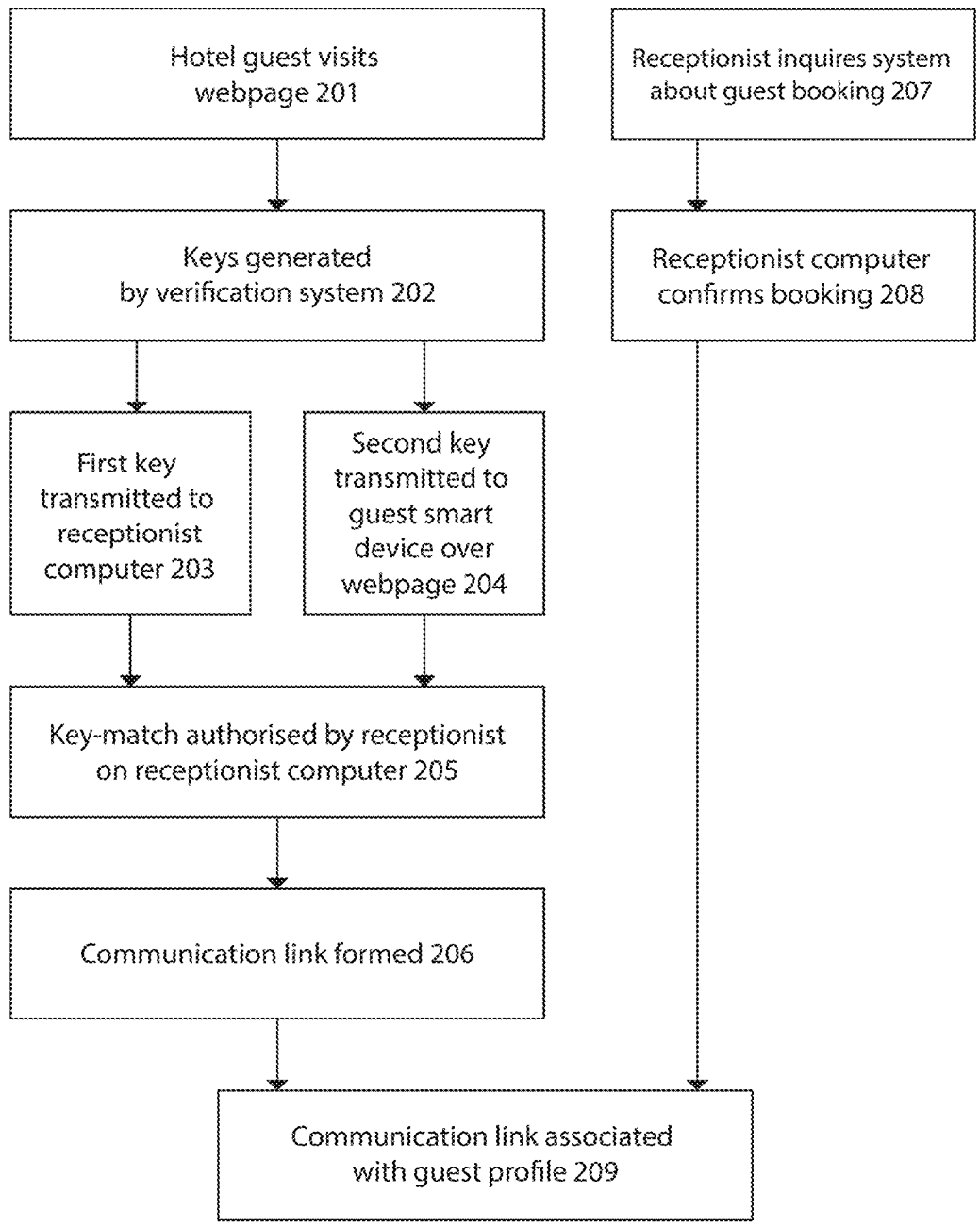
FIG. 8 is a process diagram of an example method according to the invention.

FIG. 8 is a process diagram of an example method according to the invention, where the guide user is a receptionist at a hospitality location, and the invitee user is a guest at the hospitality location with a pre-existing booking in the booking system of the hospitality location. Except for the pre-existing booking, the guest and the receptionist do not know each other, and the hospitality system does not fully know the guest either.

The guest enters the lobby, walks to the front desk and informs the receptionist about the pre-existing booking. The receptionist asks the guest what his/her name is or about other name-level data.

Provided this name-level information, the receptionist uses his/her guide device to query the verification system about the guest booking 207 over the first authorised communication channel. If there is such booking, the verification system transmits a guest profile to the receptionist guide device 208. This serves as verification that such booking exists for the guest, and the check-in continues.

Either on the guest's own initiative but more likely at the request of the receptionist, the guest uses his/her smart device to visit a web page 201 thus forming the second connection channel between the verification system and the invitee device.

The verification system generates two keys and s safe data transfer communication link 202 that is yet inactive.

The verification system transmits a first key 203 to the receptionist device and transmits the second key 204 to the guest device over the first and second channels, respectively.

Either by the guest's own motion, but more likely prompted by the receptionist or instruction on the web page, the guest shows his/her key or says it aloud to the receptionist. Once the receptionist has both keys for comparison, the receptionist can authorise the key-match 205.

This forms 206 the communication link thus allowing safe data transfer. However, there is still no guest associated with the communication link.

Then, the receptionist associates 209, i.e., the newly created secure communication link, to the guest profile that was retrieved 208 from the verification system previously. Thereby, a personalised and secure connection is formed for exchange of identity-level data.

Figure 9:
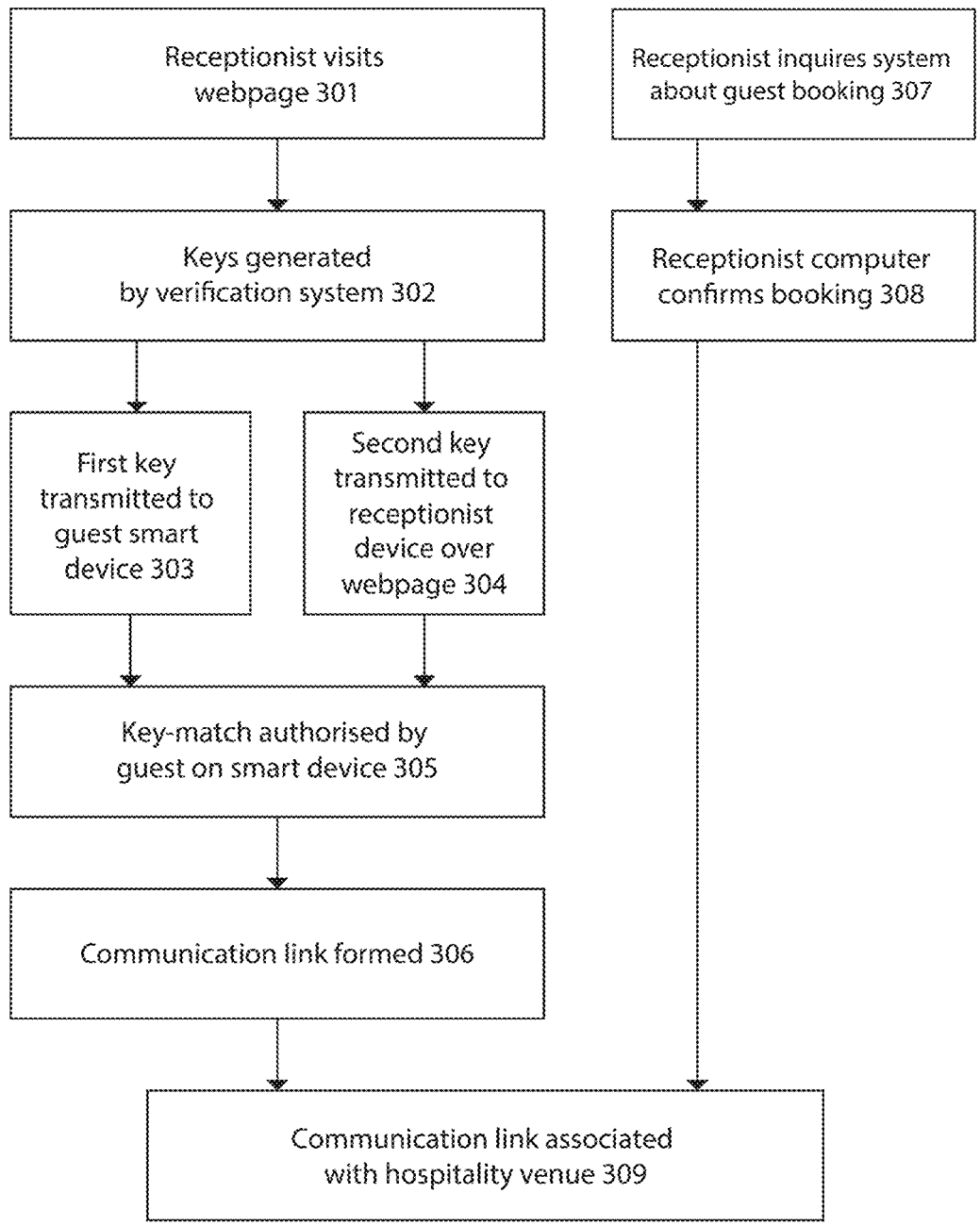
FIG. 9 is a process diagram of a different example method according to the invention.

FIG. 9 is a process diagram of a different example method according to the invention, i.e., in a sense opposite to the method of FIG. 8. However, some of the method steps are identical. The method may be performed in this manner, where a guest already has a guest profile in the verification system with identity-level data that the guest wishes to share securely with an unknown hospitality staff of a hospitality location that is not connected to the verification system.

Hospitality locations require some identity-level data from guests. In some establishments, guests will be asked to hand over identity items such as passports and driving licenses as collateral to guard against fraud or to photocopy, write from, or to perform other such process. Especially when guests visit foreign countries, where they are already vulnerable to theft and perhaps feel less safe, handing over identity items may seem very dangerous.

For these users, using a method according to the invention as shown in FIG. 9 may alleviate some of the anxiety of this conventionally stressful process.

The method progresses as follows. As the guest guide user approaches the front desk, s/he is asked about name-level information which s/he provides. Then, the receptionist consults his/her booking system 307 as to whether such a person has made a booking. If such booking has been made, the receptionist brings this booking to the screen of their device 308.

Initially, the receptionist may ask for identity-level data on the guest according to some conventional method. Then, the guest guide user counters this by directing the receptionist invitee user to visit a web page 301 with the promise that this process will lead to transmitting the necessary data to the receptionist invitee device electronically. As the receptionist invitee user visits the web page, two keys and a communication link are generated 302, and the keys are transmitted 303 to the guide device and transmitted 304 to the invitee device, respectively.

Services already exist with pre-attributed locations for many hotels and other venues. These services may then be relied upon for retrieving the precise location during use, whereby the verification system may very well recognise the venue based on the location of the guide user. The guide user may be prompted a shortlist of likely venues to help pinpoint the exact venue if needed. If this is not feasible or possible, a global key is used.

The receptionist invitee user tells the guest guide user what key appears on the receptionist screen. The key-match 305 of this embodiment can be fundamentally performed in two different ways. Either the key is global and entered manually by the guide guest user as told by the receptionist invitee user. Alternatively, to localise the key, the guest guide user shares location-level data with the verification system, and the receptionist invitee device is also located in some fashion. The receptionist invitee device can be located either by also sharing location-level data, by selecting their establishment from a list, or it may be sufficiently approximated from meta data such as IP address.

No matter the fashion taken by the keys, the communication link is thus formed 306 and data can be transferred from the guest guide device through the personalised and secure channel to the receptionist invitee user. Since the guest profile stored in the hospitality booking system and the communication link being formed are performed by two disparate systems in the method according to FIG. 9, the communication link is associated 109 with the guest profile and thus secure and personalised to be between the specific guest and the specific hospitality location, when the guest guide user forms the communication link 306.

The method may be useful for providing a receptionist with passport identification for example. When the communication link is associated, a list of documents available on the guest guide user may be provided to the receptionist. If the receptionist asked for a passport, and a passport document is available through the connection, the receptionist may make a request to download the passport. In an embodiment, the guide user is asked permission to share the specific document. Then, the receptionist is preferably asked what file format to download, and then s/he transfers the passport to the receptionist device. If s/he desires other files, any such identity-level data may now be exchanged over the secure communication link. Once the receptionist has retrieved the files, they can be connected to the guest profile of the receptionist systems. When the communication link is no longer needed, it is preferably terminated thus ensuring that the guest invitee user data is not left vulnerable.

Figure 10:
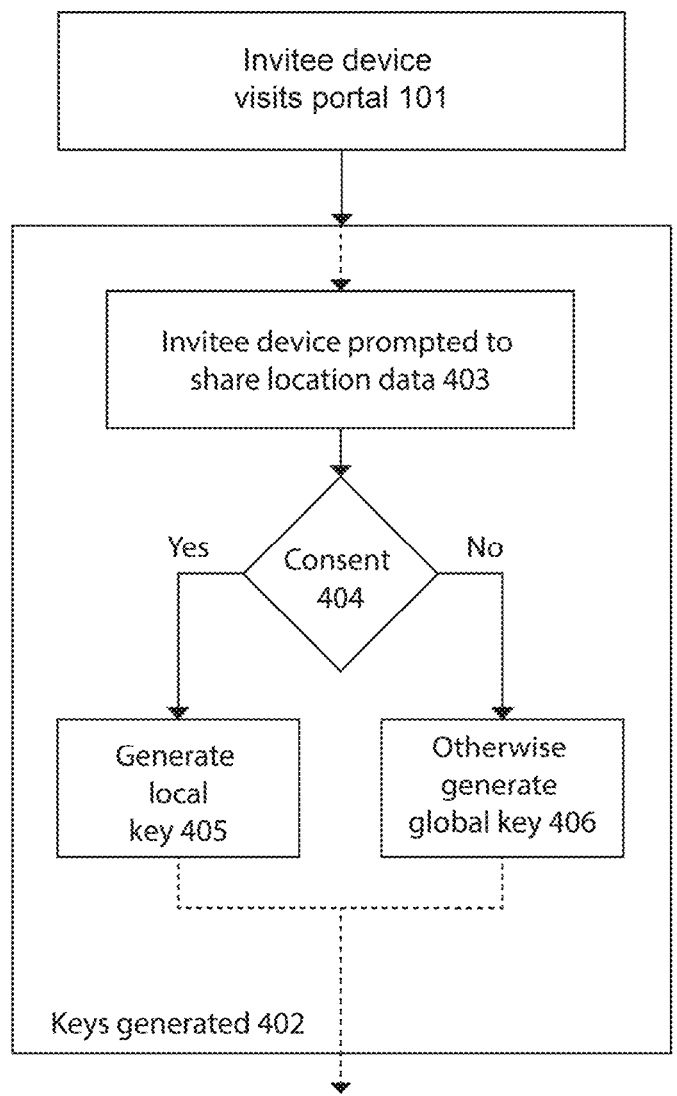
FIG. 10 is a process diagram of an exemplary key generation step according to the invention.

FIG. 10 is a process diagram of an exemplary key generation step 402 according to the invention. In many of the discussed embodiments, keys are simply generated when an invitee user visits the portal. A preferable solution is shown in FIG. 10.

When the invitee device visits the portal 101, a communication link is generated 407 awaiting verification to allow safe transfer of data.

Further, the portal requests location-level data from the invitee device 403. A simple example of this is shown in FIG. 5A, where an invitee user is asked to share location services with the verification system. The technical implementation of this, such as whether it relies on GPS, GPS and WIFI or other sensors, relies on the smart device software.

Looking at FIG. 10 again, the method assumes that a user can provide consent 404 to share device location-level data. The location-level data serves to identify the device of the invitee user partially. This ensures that the verification system can reduce the viable guide devices to a useful handful of devices. Preferably, this is performed by sharing location, so the verification system is informed of where the device is. The preferred level of detail for this is when the verification system derives the establishment based on the location-level data, such as a specific hotel. For example, if only one establishment on a given street is serviced by the verification system, even an imprecise location will be enough to determine that the guest is at the given establishment. This allows the portal to communicate as a trusted establishment-related portal thus increasing trust and making the guest feel safe. For example, the colours, fonts and text may be adapted to be an establishment-specific landing page.

If several establishments are within the uncertainties of the location-type data provided by the invitee device, the method cannot select a given establishment accurately. A local key 405 may still be useful. A local key 405, which is not establishment-specific, may take up a key slot such as '73' of each of the possible establishments within range and then be deleted from all establishments when selected in the establishment, where a receptionist, server, attendant or other personnel matches the key '73' with a key on a guest invitee device.

The local key, which is not establishment-specific, may be of a different type than the establishment-specific local key. For example, it may be two alphanumeric characters alone, or three numbers, or two numbers and an alphanumeric character. Such differentiation may allow staff to infer, when data reception is poor to allow system improvement.

If an invitee device fails to provide sufficiently high-quality location-level data to the verification system, a global key is generated. This may either happen when a user rejects providing consent 404, or it may happen for other reasons, a prominent reason being technical difficulties in retrieving or sending location-level data. A high load on mobile network, or faulty GPS chip or other situations may make such a backup solution very useful.

What is claimed is:

1. A method carried out by a computer verification system for establishing ad-hoc trust between an electronic guide device operated by a guide user and an electronic invitee device operated by an invitee user to exchange sensitive guest data, the method comprising:
   receiving, by the computer verification system, guest profile and guest name-level data from a guest as part of a booking procedure;
   receiving, after the receiving the guest profile and the guest name-level data as part of the booking procedure, a request from the electronic guide device for data pertaining to a specific guest profile, the request comprising guest name-level data presented by the invitee user to the guide user, the electronic guide device and the computer verification system communicating through an authorized first communication channel;
   transmitting a guest booking confirmation to the electronic guide device;
   receiving a connection request from the electronic invitee device through an internet browser accessible public access portal, thereby providing an unverified second communication channel between the computer verification system and the electronic invitee device;
   generating two unique and matching keys in response to the connection request received;
   transmitting a first of the two unique and matching keys through the authorized first communication channel to the electronic guide device;
   transmitting a second of the two unique and matching keys through the unverified second communication channel to the electronic invitee device, wherein the two unique and matching keys are expressible through a sense output device of the electronic guide and electronic invitee devices, thereby providing keys on both the electronic guide and electronic invitee devices for sensory comparison and verification by the guide user; and
   receiving a verification signal from the electronic guide device, the verification signal indicative of a successful key-match performed by the guide user, thereby verifying the unverified second communication channel to a second, now verified, communication channel for exchange of sensitive data by forming a secure communication link between the electronic guide device and the electronic invitee device via the first authorized communication channel and the computer verification system and the second, now verified, communication channel.

2. The method of claim 1 further comprising: associating the secure communication link with the specific guest profile.

3. The method of claim 1, wherein the guide user and the invitee user are connected to a hospitality system having booking information on guests, and wherein the name-level data is retrieved from the hospitality system.

4. The method of claim 1, wherein the invitee user is the guest.

5. The method of claim 1, wherein the two unique and matching keys are transient keys that are set to expire when either of the following conditions is met:
the unverified second communication channel is verified, or
a duration has passed since generation of the two unique and matching key.

6. The method of claim 5, wherein the duration is 24 hours or less.

7. The method of claim 1, further comprising:
consulting, before the generating the two unique and matching keys, a blacklist of precluded keys to ensure that none of the precluded keys are re-generated;
adding, after the generating the two unique and matching keys, the two unique and matching keys to the blacklist of precluded keys; and
removing, after the receiving the verification signal, the two unique and matching keys from the blacklist of precluded keys.

8. The method of claim 1, wherein the electronic invitee device is attempted to be partially identified before a set of matching keys are generated, where a set of locally unique keys are generated, if the partial identification is successful, or otherwise a globally unique key is generated.

9. The method of claim 8, wherein the attempted partial identification is performed by requesting the electronic invitee device to share its location data with the computer verification system.

10. The method of claim 1, wherein the secure communication link is used to request identity-level data of the guest from the electronic invitee device to further fill out the specific guest profile as part of a check-in procedure of a hospitality venue, and then transmit the identity-level data of the guest from the electronic invitee device.

11. The method of claim 1, wherein an address of the public access portal is provided as an electronic tag directing the invitee user to the address of the public access, where the electronic tag is in the same room as the electronic guide device.

12. The method of claim 1, wherein at least two unique connection requests are received through the public access portal by at least two electronic invitee devices to generate a corresponding number of unique and matching sets of keys, where first keys of each matching set generated by the unique connection requests and transmitted over the authorized first communication channel to the electronic guide device are displayed next to each other for selection on a key-screen of the electronic guide device.

13. A data processing verification system comprising:
a processor; and
a non-transitory computer-readable storage medium, the medium comprising instructions, which when executed by the processor, causes the processor to:
receive guest profile and guest name-level data from a guest as part of a booking procedure;
receive, after receiving the guest profile and the guest name-level data as part of the booking procedure, a request from the electronic guide device for data pertaining to a specific guest profile, the request comprising guest name-level data presented by the invitee user to the guide user, the electronic guide device and the computer verification system communicating through an authorized first communication channel;
transmit a guest booking confirmation to the electronic guide device;
receive a connection request from the electronic invitee device through an internet browser accessible public access portal, thereby providing an unverified second communication channel between the computer verification system and the electronic invitee device;
generate two unique and matching keys in response to the connection request received;
transmit a first of the two unique matching keys through the authorized first communication channel to the electronic guide device;
transmit a second of the two unique and matching keys through the unverified second communication channel to the electronic invitee device, wherein the two unique and matching keys are expressible through a sense output device of the electronic guide and electronic invitee devices, thereby providing keys on both the guest electronic guide and electronic invitee devices for sensory comparison and verification by the guide user; and
receive a verification signal from the electronic guide device, the verification signal indicative of a successful key-match performed by the guide user, thereby verifying the unverified second communication channel to a second, now verified, communication channel for exchange of sensitive data by forming a secure communication link between the electronic guide device and the electronic invitee device via the first authorized communication channel and the computer verification system and the second, now verified, communication channel.

14. A computer program comprising:
instructions stored on non-transitory computer-readable storage medium which, when the computer program is executed by a computer, causes the computer to:
receive guest profile and guest name-level data from a guest as part of a booking procedure;
receive, after receiving the guest profile and the guest name-level data as part of the booking procedure, a request from the electronic guide device for data pertaining to a specific guest profile, the request comprising guest name-level data presented by the invitee user to the guide user, the electronic guide device and the computer verification system communicating through an authorized first communication channel;
transmit a guest booking confirmation to the electronic guide device;
receive a connection request from the electronic invitee device through an internet browser accessible public access portal, thereby providing an unverified second communication channel between the computer verification system and the electronic invitee device;

generate two unique and matching keys in response to the connection request received;

transmit a first of the two unique matching keys through the authorized first communication channel to the electronic guide device;

transmit a second of the two unique and matching keys through the unverified second communication channel to the electronic invitee device, wherein the two unique and matching keys are expressible through a sense output device of the electronic guide and electronic invitee devices, thereby providing keys on both the guest electronic guide and electronic invitee devices for sensory comparison and verification by the guide user; and receive a verification signal from the electronic guide device, the verification signal indicative of a successful key-match performed by the guide user, thereby verifying the unverified second communication channel to a second, now verified, communication channel for exchange of sensitive data by forming a secure communication link between the electronic guide device and the electronic invitee device via the first authorized communication channel and the computer verification system and the second, now verified, communication channel.

15. A non-transitory computer-readable storage medium comprising:

instructions which, when read and executed by a computer, cause the computer to:

receive guest profile and guest name-level data from a guest as part of a booking procedure;

receive, after receiving the guest profile and the guest name-level data as part of the booking procedure, a request from the electronic guide device for data pertaining to a specific guest profile, the request comprising guest name-level data presented by the invitee user to the guide user, the electronic guide device and the computer verification system communicating through an authorized first communication channel;

transmit a guest booking confirmation to the electronic guide device;

receive a connection request from the electronic invitee device through an internet browser accessible public access portal, thereby providing an unverified second communication channel between the computer verification system and the electronic invitee device;

generate two unique and matching keys in response to the connection request received;

transmit a first of the two unique matching keys through the authorized first communication channel to the electronic guide device;

transmit a second of the two unique and matching keys through the unverified second communication channel to the electronic invitee device, wherein the two unique and matching keys are expressible through a sense output device of the electronic guide and electronic invitee devices, thereby providing keys on both the guest electronic guide and electronic invitee devices for sensory comparison and verification by the guide user; and receive a verification signal from the electronic guide device, the verification signal indicative of a successful key-match performed by the guide user, thereby verifying the unverified second communication channel to a second, now verified, communication channel for exchange of sensitive data by forming a secure communication link between the electronic guide device and the electronic invitee device via the first authorized communication channel and the computer verification system and the second, now verified, communication channel.

* * * * *